No. 851,495. PATENTED APR. 23, 1907.
W. CHURCHILL.
ART OF SIGNALING BY LIGHT RAYS.
APPLICATION FILED NOV. 5, 1904.
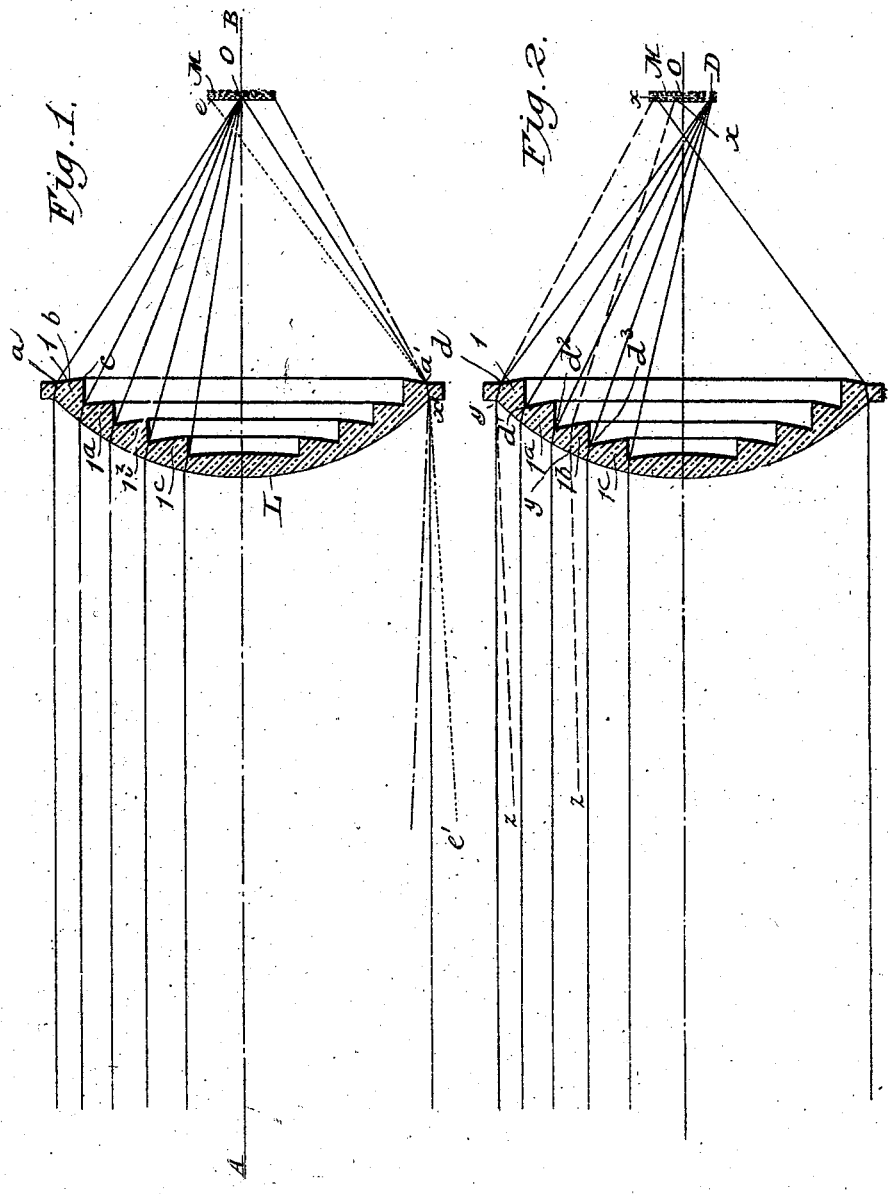

UNITED STATES PATENT OFFICE.

WILLIAM CHURCHILL, OF NEW BRITAIN, CONNECTICUT, ASSIGNOR TO CORNING GLASS WORKS, OF CORNING, NEW YORK.

ART OF SIGNALING BY LIGHT-RAYS.

No. 851,495.      Specification of Letters Patent.      Patented April 23, 1907.

Application filed November 5, 1904. Serial No. 231,506.

*To all whom it may concern:*

Be it known that I, WILLIAM CHURCHILL, a citizen of the United States, residing at New Britain, in the county of Hartford and State of Connecticut, have invented new and useful Improvements in the Art of Signaling by Light-Rays, of which the following is a specification.

This invention relates to an improved method of constructing lenses of the Fresnel type, and of such form as are employed, more particularly, in connection with signal lamps and lanterns used on railroads, and in the marine service, whereby light rays that have hitherto been lost by dispersion are caused to bend or be so refracted as to enter the beam of light projected by the lens and greatly increase the luminosity and penetrative power of the light.

In order to render effective the light from a kerosene lamp or other source of artificial illumination, and intended to serve as a signal as is customary, for example, in railway and marine service, and at a greater range than is possible without some such device, it is customary to make use of a lens so constructed in accordance with the laws of optics as to bend a certain proportion of the light rays emanated into a parallel bundle. In the type of Fresnel lens generally employed in the marine service, the bending takes place only in such a way as to produce a fan of light thrown out toward the horizon. In a railroad semaphore, the bending of the rays is effected both as in the case of the marine Fresnel, and also along a straight line, so that the result is to produce, approximately, a cylindrical bundle or beam of parallel rays having a cross section of the size of the lens employed. In designing such lenses, allowance is ordinarily made for the spherical aberration found in all lenses by altering the curvature of one or both faces of the lens at different points, since rays passing through the outer edges of the lens experience more spherical aberration than those passing nearer the center. The alteration referred to consists in dividing the surface of the lens into zones and reducing the curvature of each zone progressively from the center to the outer edge of the lens. The precise curvatures necessary depend, of course, upon the laws governing the refraction of light passing through a lens, and the curvatures vary, as is well known, according to the refractive index of the glass used and with the focal distance desired for the lens. In designing such lenses, heretofore, it has been customary to focus all parts of the lens as closely as possible to a theoretical point of light estimated to be situated in the center of the flame or other source of illumination. A lens which focuses in all parts most closely to such theoretical point is most nearly perfect for use in an optical instrument, such as a microscope or a telescope, or for photographic purposes; and it has been supposed, apparently, that the same method would give the best results when applied to lenses intended to throw light serving as a signal in a certain path. There are, however, certain disadvantages in this method when used for railroad and marine purposes. In the first place, a large proportion of the area of the flame or other source of illumination employed is totally non-effective. As is well known in accordance with the law of optics, assuming that a certain point of the lens is focused at the center of the flame or very close to that point opposite the light which that portion of the lens is receiving from the center of the flame, it is also at the same time receiving rays from all other luminous points in the flame. Only the light which comes from the point in the flame to which the before mentioned point in the lens is focused will be thrown in a precisely parallel path, that is to say, a path parallel to the axis of the lens. But light impinging upon the lens from other parts of the flame at a less acute angle than the ray which is thrown parallel is bent in, more or less closely, to the axis of the lens according as the angle at which it impinges upon the surface of the lens is farther or nearer from the center of the flame; and, furthermore, light rays impinging upon the same point of the lens at an angle more acute than the ray thrown parallel, are spread out from the lens, diverging from the parallel beam at angles more or less acute as the light rays involved emanate from points farther from or nearer to the center of the flame. Such light rays as are thrown out at a more acute angle to the surface of the lens than the parallel rays are, because of their dispersion, totally ineffective at any considerable distance from the lens. The light, however, which is thrown at an angle inside of the parallel ray, although focusing at some point more or less near to the lens, will be, or a large proportion of it, at least, effective at considerable distances, or as long as it remains within the light beam. Furthermore, all lenses pressed in molds, as is customary in the manufacture of railway semaphores, and Fresnel lenses for marine service, etc. are more or less liable to slight variation due to inequalities in the contraction of the glass upon cooling, such as a slight flattening of the curvature at any point (and the defect involved is nearly always a flattening rather than an increase of curvature) which inequality will throw the focus for that particular point back more or less from the center of the flame. The result of this defect will be that the adjustment between flame and lens will be more or less seriously deranged, and any flattening of curvature whatsoever will result in some loss of light.

To overcome the defects arising from previous methods of constructing and focusing lenses of the type hereinabove described, the present method has been devised wherein, instead of focusing to a point as has heretofore been the custom, it has been assumed that a certain area of the flame is equally effective for purposes of illumination, the size of such area being dependent upon the size of flame available. The lens is then formed in such a way as to bring the foci for the different parts of each zone of the lens at various distances inside the plane of the illuminant, that is to say, between the flame and the lens. Now although there may be no light whatsoever at the theoretical focal point, a line prolonged through this point from any given point upon the lens, provided it strikes the flame within the luminous area hereinbefore mentioned, will receive its full quota of luminous rays.

To more clearly illustrate the improved method of lens construction, reference may be had to the accompanying drawing, in which,—

Figure 1 is a diagrammatic view of a semaphore lens of the usual type showing also a burner flame and rays of light emanating therefrom and passing through the lens. Fig. 2 is a similar view of a lens, made in accordance with my improved method, in connection with a flame, and lines indicating rays of light.

In Fig. 1, a lens L is shown, each zone 1, 1$^a$, etc. of which is focused as closely as possible to the center O of the flame M. Since the spherical aberration present in any double convex lens renders it impossible to focus any two points on the surface of the lens at the same point in the flame unless such points are located on equal radii from the axis A, B, of the lens, the desired result is obtained, approximately, by focusing one point, say $a$, upon the center of the flame, and thereafter bringing the foci for other points close to the center. Thus, if the point $a$ in zone 1, Fig. 1, is focused at the center O of the flame M, the foci for the points $b$ and $c$ in the same zone will be close to the same center. The same may be said for the other zones.

In my improved method of construction, instead of designing the curvatures of each zone so that the various points of such zone focus as closely as possible to the center of the flame, the outer edge of each zone is focused upon a point in the flame situated a certain distance on the side of the axis opposite the side upon which the point of such zone is located. This is illustrated in Fig. 2, in which it will be seen that the points $d$, $d'$ etc. on the outer edge of the zones 1, 1$^a$, etc. are focused at different points on the axis A B, crossing which they converge on the luminous surface at D, a point outside the center O of the flame. In a circular lens such as is represented in the diagram, the points D will describe a circular area with O as its center. The diameter of the luminous circular area will, of course, depend upon the size of the flame. If the luminous surface is large, the distance between the center O and the point D will be correspondingly increased. The entire luminous surface within the circular area will be available for illumination, as all the rays emanating therefrom will form less acute angles than the rays passing through the point D, and on emerging from the lens they will be bent more or less toward the axis A B, see dotted lines $x$, $y$, $z$. By giving the correct curvature to the several zones relative to the area of the illuminating surface, practically all the light rays passing through the lens will be parallel or convergent. Very few will diverge and be lost.

In the old method of constructing lenses, where the focus is at the center of the flame, all light rays emanating from the luminous surface between its center and outer edge, and passing across the axis of the lens are lost, inasmuch as they diverge from the axis. This is clearly shown in Fig. 1, where a light ray from the point $e$ of the luminous surface crosses the axis A B to the point $a'$ on the zone 1, and thence through the lens in the path $x'$ $e'$. It is obvious, therefore, that light rays emanating from one half of the flame or luminous surface will impinge upon any point of the lens at a more acute angle than that formed by rays emanating from the focus, and hence cause these rays to diverge.

This improved method is equally applicable to the construction of cylindrical lenses and such as are used on ship lights, as to circular lenses employed in railroad signaling.

Having thus described my invention, I claim:—

An improvement in the art of signaling by light rays which consists in providing a definite and extended area of flame for effective illumination and changing the direction of light rays by focusing upon different parts of said flame area removed from the axis thereof, substantially as set forth.

In testimony whereof I affix my signature in presence of two witnesses.

WILLIAM CHURCHILL.

Witnesses:
GEORGE H. HOWARD,
C. B. BULL.